United States Patent [19]

Kinoshita et al.

[11] Patent Number: 5,044,162
[45] Date of Patent: Sep. 3, 1991

[54] CONTROL SYSTEM FOR INTERNAL COMBUSTION ENGINE WITH SUPERCHARGER

[75] Inventors: Hiroshi Kinoshita, Hiroshima; Ikuo Okamoto, Hiroshima, both of Japan

[73] Assignee: Mazda Motor Corporation, Hiroshima, Japan

[21] Appl. No.: 366,514

[22] Filed: Jun. 15, 1989

[30] Foreign Application Priority Data

Jun. 16, 1988 [JP] Japan .................... 63-149629

[51] Int. Cl.$^5$ ............................. F02B 37/00
[52] U.S. Cl. ........................ 60/602; 123/564
[58] Field of Search ................ 60/602; 123/564

[56] References Cited

U.S. PATENT DOCUMENTS

| | | | |
|---|---|---|---|
| 4,463,565 | 8/1984 | Rydquist | 60/602 |
| 4,467,607 | 8/1984 | Rydquist | 60/602 |
| 4,612,900 | 9/1986 | Iwata | 60/602 |
| 4,646,522 | 3/1987 | Mamiya | 60/602 |
| 4,882,695 | 11/1989 | Mieno | 60/602 |

FOREIGN PATENT DOCUMENTS 57-157016  9/1982  Japan .

Primary Examiner—Douglas Hart
Attorney, Agent, or Firm—Fleit, Jacobson, Cohn, Price, Holman & Stern

[57] ABSTRACT

Control system for engine comprising supercharger for supercharging an intake gas introduced into the engine, pressure detector for detecting a supercharging pressure of the intake gas, supercharging pressure control device for controlling the supercharging pressure to a first predetermined pressure provided in accordance with engine operating condition, engine output control device for controlling an engine output other than the supercharging pressure control device. The engine output is restricted by the engine output control device when the pressure is increased beyond a second predetermined pressure which is greater than the first predetermined pressure. The second predetermined pressure is increased as the first predetermined pressure is increased for an improved supercharging pressure control.

10 Claims, 5 Drawing Sheets

CONTROL SYSTEM FOR INTERNAL COMBUSTION ENGINE WITH SUPERCHARGER

BACKGROUND OF THE INVENTION

1. Field of the Invention

This invention relates to a control system for an internal combustion engine with supercharger, specifically to a fuel control system for the engine in connection with a supercharging pressure for intake gas.

2. Description of the Prior Art

In the field of internal combustion engine for automotive, recently, a supercharger has been commonly used for supercharging intake gas for the engine to improve an output performance. As a supercharging pressure is increased, a charging effect of the intake gas is increased. Therefore, an increase of the supercharging pressure is desirable for increasing an engine output at one aspect. However, from a different aspect, this phenomenon is undesirable. This is because an undue increase of the supercharging pressure or over-supercharging of the intake gas causes an improper combustion, deteriorates a durability of the engine and affects a reliability of the engine operation.

In view of the above, there have been known various supercharging pressure control devices for restricting the supercharging pressure from an undue increase. For instance, a relief valve for an exhaust system such as a waste gate valve is employed for bypassing a part of exhaust gas from the supercharger to restrict the supercharging pressure below a predetermined value.

A relief valve for intake system such as an intake gas bypass valve is employed for bypassing a part of intake gas from the supercharger to suppress an undue increase of the supercharging pressure.

It should however be noted that the conventional supercharging pressure control devices are not actuated until the supercharging pressure has been unduly increased and therefore not responsive. Besides, when the control device is out of order or in an abnormal condition, it is difficult to control the supercharging pressure. Thus, the above supercharging devices are not sufficient to obtain a reliability of the engine operation.

Under the circumstances, Japanese Patent Public Disclosure No. 57-157016 laid open to the public on Sept. 28, 1982 has proposed a supercharging control system provided with a fuel control system for staying a fuel supply to the engine in an over-supercharged condition in addition to a supercharging pressure control device as aforementioned.

In this system disclosed in the Japanese Patent application, the supercharging pressure control device is actuated to restrict the supercharging pressure when the supercharging pressure is increased beyond a first predetermined value provided in accordance with an engine operating zone. In this case, a plurality of the engine operating zones are provided in accordance with an engine operating condition defined by an engine load, engine speed and the like. Thus, the first predetermined value changes depending on the engine operating condition as shown by a line A in FIG. 4 wherein the first predetermined value is increased as an engine output torque is increased. The fuel control system of the Japanese Patent application is actuated to stay a fuel supply when the supercharging pressure is increased beyond a second predetermined value which is greater than the first predetermined value and constant irrespective of a change of the engine operating zone as shown by a line C in FIG. 4.

It should be however noted that this control system as disclosed in the Japanese application is disadvantageous in the following points.

In the case where the supercharging pressure control device is out of control such as out of order, the fuel control is not actuated until the supercharging pressure is increased beyond the second predetermined value even when the engine operating condition is in an engine operating zone in which the first predetermined value is relatively small. Consequently, the fuel control is unlikely to be initiated actually because a difference between the first and second predetermined supercharging pressure is fairly big. This deteriorates a durability of the engine.

SUMMARY OF THE INVENTION

It is therefore an object of the present invention to provide a control system for an internal combustion engine with a supercharger which can provide a proper supercharging pressure control.

It is another object of the present invention to provide a control system for an engine with a supercharger which provides a reliable and stable engine operation.

It is still another object of the present invention to provide a control system for an internal combustion engine with a supercharger which can improve a durability of the engine.

It is yet another object of the present invention to provides a control system for an internal combustion engine with a supercharger which can provide a desirable engine output property.

According to the present invention, the above and the other objects of the invention can be accomplished by a control system for an internal combustion engine comprising supercharging means for supercharging an intake gas introduced into the engine, pressure detecting means for detecting a supercharging pressure of the intake gas, supercharging pressure control means for controlling the supercharging pressure to a first predetermined pressure provided in accordance with an engine operating condition, engine output control means for controlling an engine output other than the supercharging pressure control means, the engine output being restricted by the engine output control means when the supercharging pressure is increased beyond a second predetermined pressure which is greater than the first predetermined pressure, the second predetermined pressure being increased as the first predetermined pressure is increased. The first predetermined pressure can be defined by an engine speed and/or an engine load. Likewise, the second predetermined pressure can be defined by the engine speed and/or the engine load. The first and second predetermined pressures are increased as the engine speed is increased until the engine speed reaches an intermediate zone of around 3000–4000 rpm in engine speed and are decreased as the engine speed is increased beyond the intermediate zone. The engine output control means controls a fuel supply to the engine in a manner that the fuel supply is stayed when the supercharging pressure is greater than the second predetermined pressure.

The engine output control means may control an ignition timing in accordance with the supercharging pressure.

According to the present invention, in the case where the supercharging pressure of the intake gas introduced into the engine is increased beyond the first predetermined pressure, the supercharging pressure control means is actuated to reduce the supercharging pressure. Then, when the supercharging pressure is increased beyond the second predetermined pressure, the engine output control means is actuated to restrict the engine output. For instance, the engine output control means stays a fuel supply to the engine under such over-supercharged condition. Thus, the supercharging pressure of the intake gas can be reliably and stably controlled according to the present invention.

In particular, the second predetermined pressure is increased as the first predetermined pressure provided in accordance with engine output property is increased. Thus, the engine output property is not affected by the supercharging pressure control even when the engine operation condition changes abruptly such as an abrupt change from a high engine speed condition to a reduced engine speed condition.

The above and other objects and features of the present invention will become apparent from the following description in connection with the preferred embodiment taking reference with the accompanying drawings.

DESCRIPTION OF THE PREFERRED EMBODIMENTS

Figure 1:
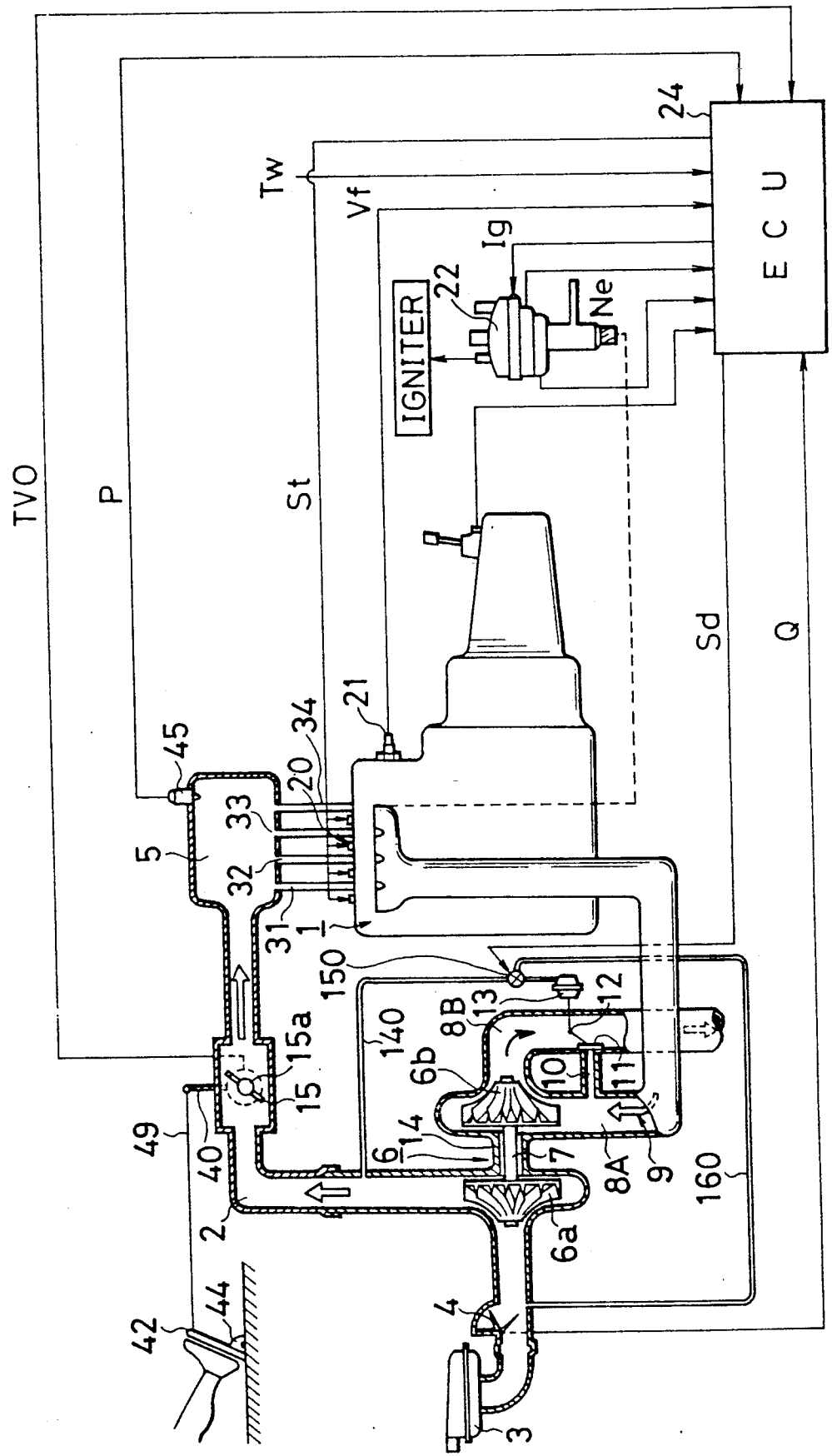
FIG. 1 is a schematic view of an intake and exhaust systems of an engine with a supercharger in accordance with a preferred embodiment of the present invention.

Referring to the drawings, specifically to FIG. 1, there is shown a schematic view of a fuel supply system of an internal combustion engine 1 with a turbo supercharger 6. The illustrated engine 1 is provided four cylinders in series.

The supercharger 6 is provided with a compressor wheel 6a for compressing an intake gas, a turbine wheel 6b for driving the compressor wheel 6a, a rotation shaft 7 connecting the compressor wheel 6a and the turbine wheel 6b and a journal section 14 for rotatably mounting the shaft 7.

An intake passage 2 is communicated with individual intake passages 31, 32, 33 and 34 of first, second, third and forth cylinders through a surge tank 5. An air cleaner 3, air flow meter 4, the compressor wheels 6a of the supercharger 6, throttle valve 15 and the surge tank are disposed in the intake passage 2 in this order from the upstream to the downstream.

An intake air is introduced into the air cleaner 3 and then to the air flow meter 4 for measure and to the compressor for compression or supercharging and to eventually to the respective cylinders of the engine 1 through the throttle valve 15 and the surge tank 5.

A rotation shaft 15a of the throttle valve 15 is connected with one end of a link lever 40 which is mechanically connected with one end of an acceleration pedal 42 through an acceleration wire 49 at the other end. The acceleration pedal 42 is provided with a stroke sensor 44 for detecting a stroke Θa of the acceleration pedal 42.

The turbine wheel 6b is disposed in an exhaust passage 9. The turbine wheel 6b is driven by an exhaust gas energy to drive the compressor wheel 6a so as to supercharge the intake gas.

An inlet passage portion 8A of the exhaust gas passage 9 or upstream portion of the turbine is connected with an outlet portion 8B of the exhaust gas passage 9 or downstream portion of the turbine through a relief passage 10. A waste gate valve 11 is disposed at a joint portion of the relief passage 10 and the outlet portion 8B of the exhaust gas passage 9.

The waste gate valve 11 is connected with a drive shaft of a waste gate actuator 13 constituted by a diaphragm through a link lever 12. The actuator 13 is adapted to be communicated with the intake passage 2 at a position upstream of the compressor wheel 6a of the supercharger 6 through a three way solenoid valve 150 and a relief passage 160 and at another position downstream of the compressor wheel 6a through the valve 150 and a pressure passage 140.

Figure 6:
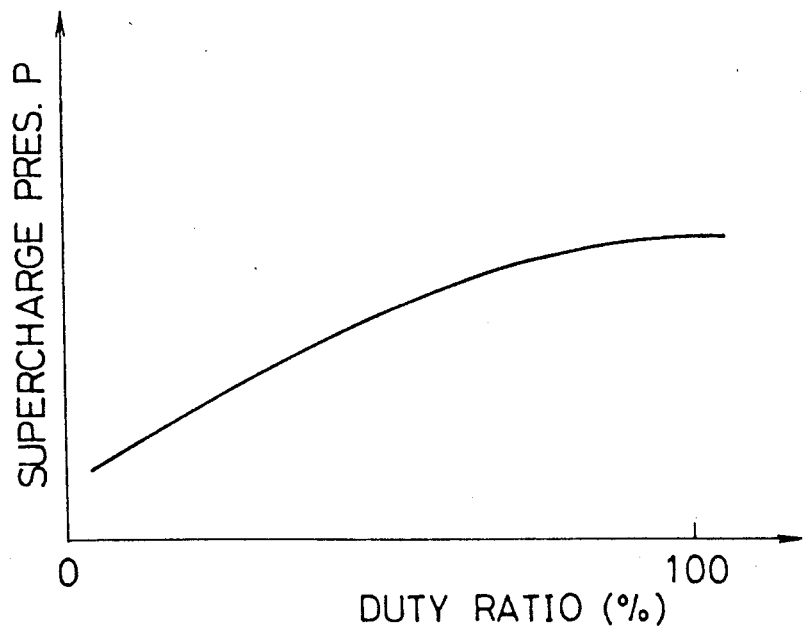
FIG. 6 is a graphical representation showing a relationship between a duty ratio of a solenoid valve for a waste gate valve and a supercharging pressure.

The solenoid valve 150 is controlled based on a duty ratio as a supercharging pressure control signal Sd produced by a control unit 24 so that open period of the valve 150 is controlled to change a pressure introduced into the actuator. Thus, opening of the waste gate valve 11 can be controlled so as to suppress the supercharging pressure P below a first predetermined value P0 or a first reference pressure. In FIG. 6, there is shown a relationship between the duty ratio for the solenoid valve 150 and the supercharging pressure P.

Figure 4:
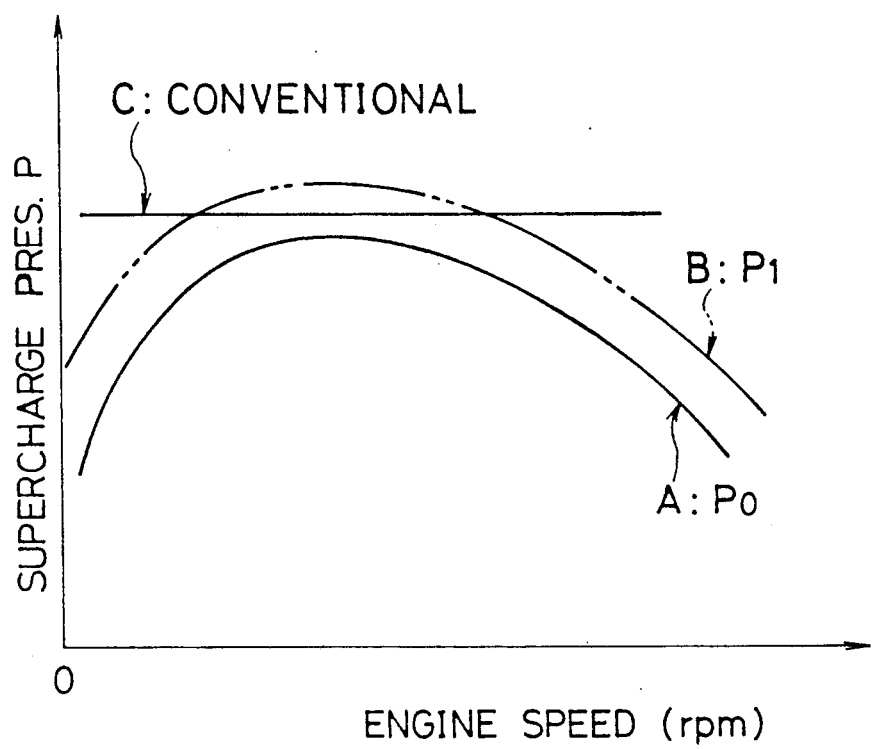
FIG. 4 is a graphical representation showing respective properties of a first and second predetermined pressures.
Figure 5:
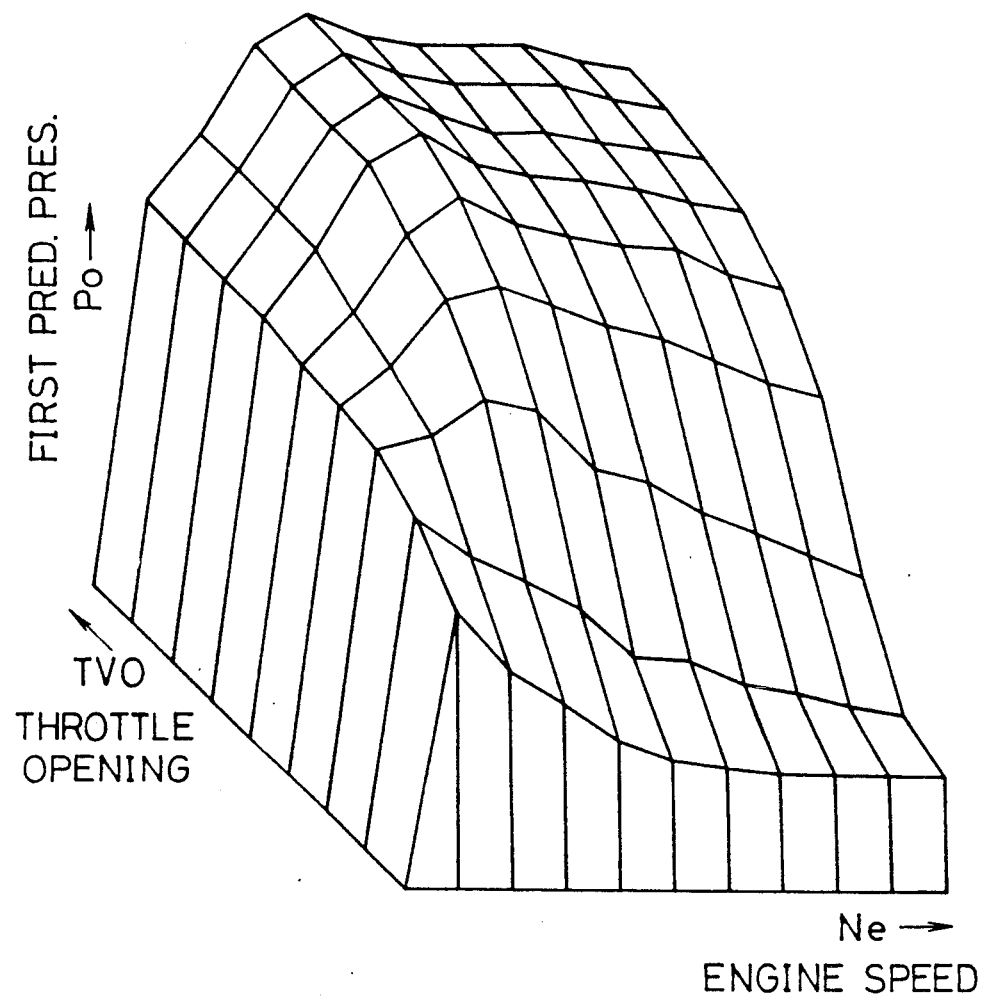
FIG. 5 is a perspective view showing a three dimensional map providing a first predetermined pressure.

In controlling the waste gate 11, the first predetermined pressure P0 or a first reference pressure changes as shown by the line A in FIG. 4 in relation with the engine speed. More specifically, the first predetermined supercharging pressure P0 can be provided as a three dimensional map as shown in FIG. 5 defined by the engine operating condition such as the engine load or throttle valve opening TVO and engine speed Ne.

The engine 1 is also provided with a distributer 22 for providing each of an ignition plug of the cylinder with a high voltage secondary current at a predetermined timing.

Signals from the distributor 22 denoting engine speed Ne and ignition timing Ig are introduced into the control unit 24.

The control unit 24 receives various signals such as a signal Θa from the acceleration pedal stroke sensor 44, the supercharging pressure P from a supercharging pressure sensor 45, a knocking signal Vf from a knocking sensor 21, an intake gas amount Q from the air flow meter 4, an on-off signal of an idle contact denoting an idling condition of the engine based on a position of the throttle valve, throttle opening signal TVO, coolant temperature Tw and the like which signals are necessary to control engine torque, supercharging pressure, air fuel ratio, ignition timing, knocking and the like. The control unit 24 also provides a fuel injector 20 with an injection control signal St.

Figure 2:
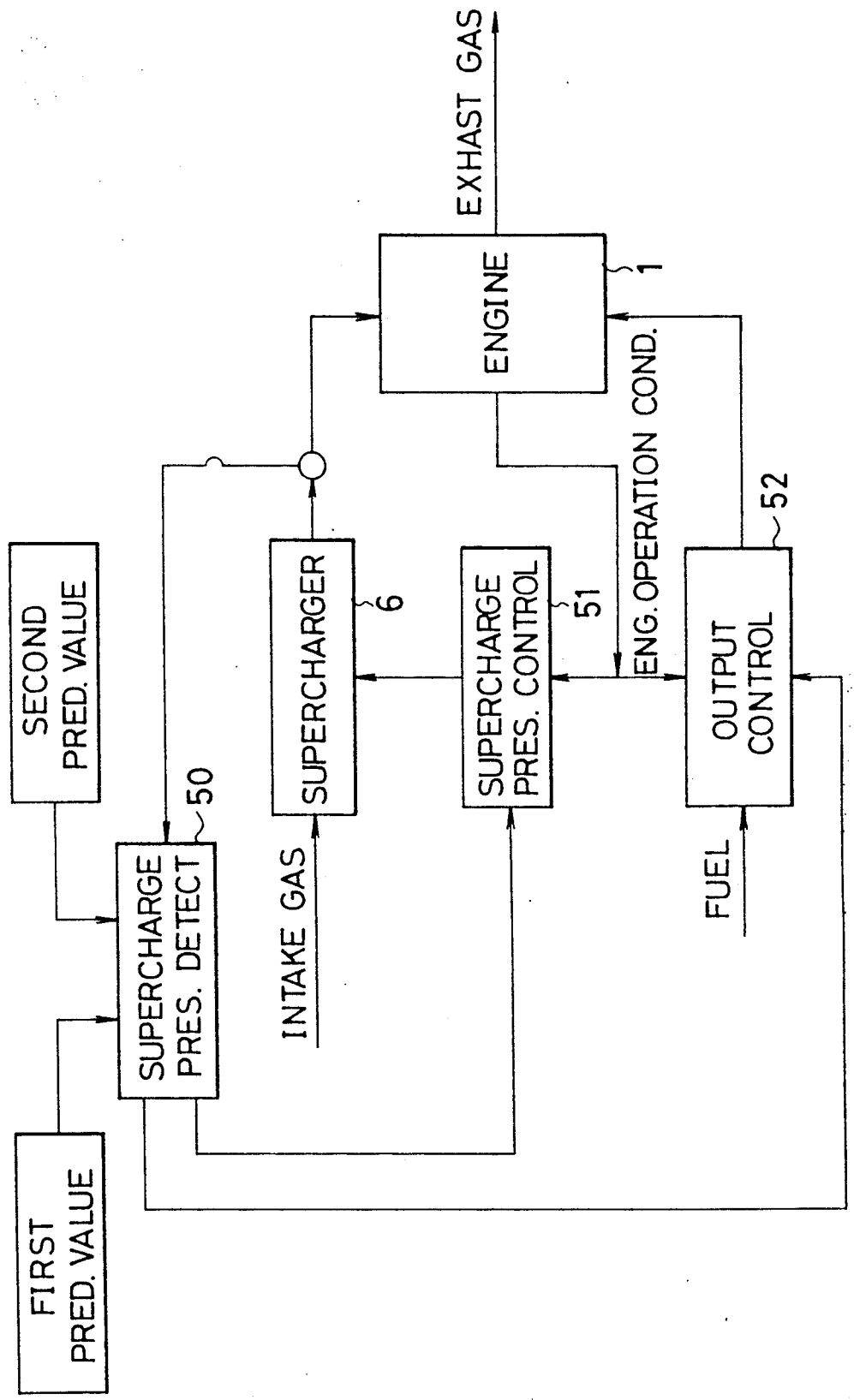
FIG. 2 is a block chart of a control unit for the engine.

The control unit 24 is preferably constituted by a micro processor and produces control signals to the engine 1 as shown FIG. 2. The control unit 24 is provided with a supercharging pressure detecting section 50 for detecting a supercharging pressure to compare with reference data therein for producing a control signal, a supercharging pressure control section 51 for controlling the supercharging pressure of the supercharger 6 based on the signal from the section 50 and an engine output control section 52 for controlling an engine output based on the signal from the supercharging pressure detecting section 50.

Figure 3:
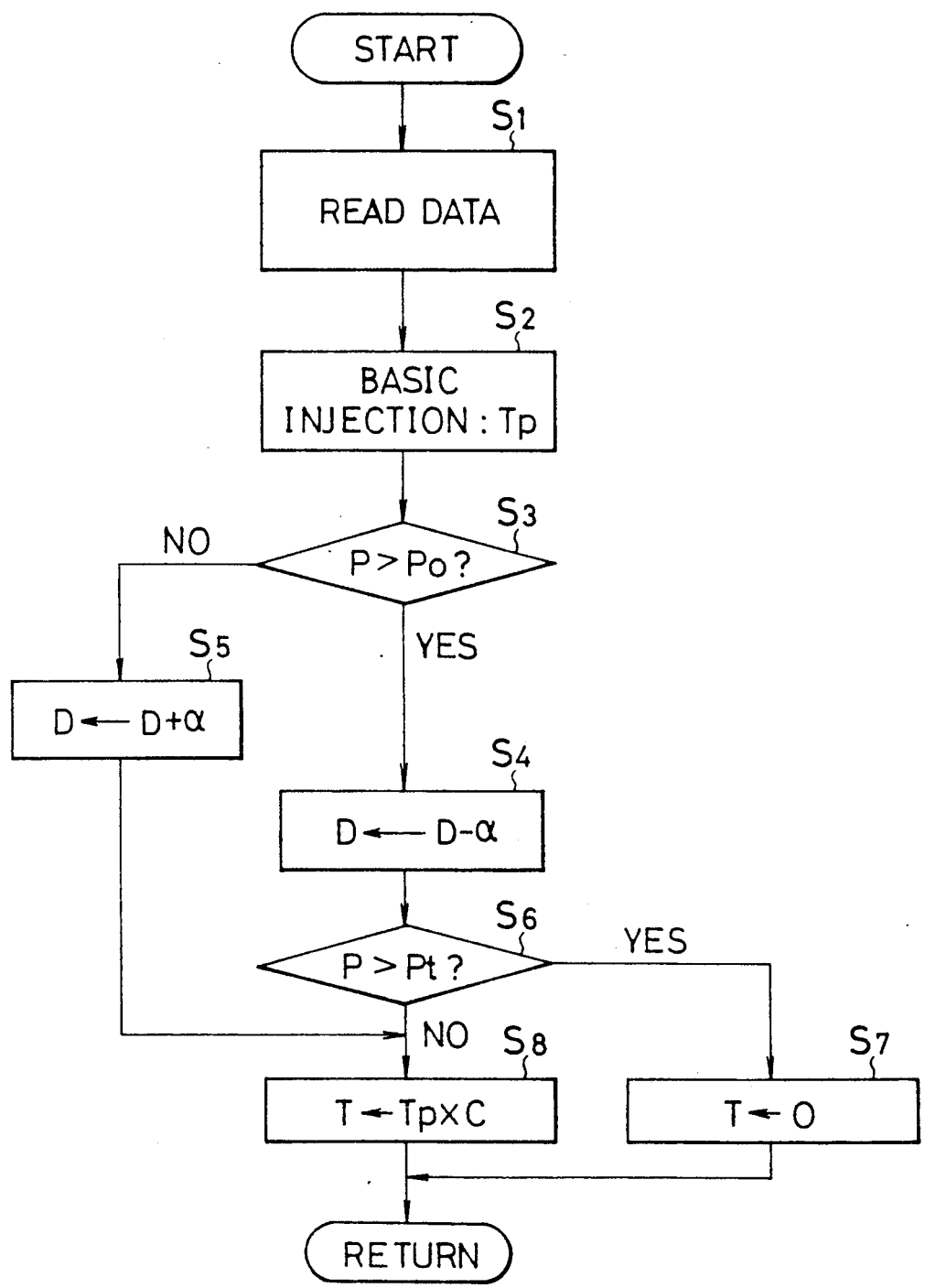
FIG. 3 is a flow chart of a control of a supercharging pressure and engine output.

Hereinafter, a control by the control unit 24 is described taking reference with a flow chart shown in FIG. 3.

In control, first of all, the control unit 24 reads various data, such as the engine speed Ne, the intake air amount Q, the supercharging pressure P, throttle opening TVO, the first predetermined value P0, second predetermined value P1 in light of a map as shown in FIG. 4 or FIG. 5 (S1).

In next, the control unit 24 calculates a basic fuel injection amount Tp based on a formula $Tp = K*Q/Ne$, wherein Q is intake air amount, Ne is engine speed and K is constant (S2). Thereafter, the control unit 24 judges whether or not the supercharging pressure P is greater than the first predetermined value P0 obtained in accordance with the engine operating condition in light of a map shown in FIG. 4 or FIG. 5.

If the judgment is yes or The value P > the first predetermined value P0, the control unit 24 sets the duty ratio D corresponding to the supercharging control signal Sd at a value (D-α) which is smaller than the present value D by a predetermined value α to increase the opening Θ of the waste gate valve 11 so that the supercharging pressure P is reduced (S4).

On the other hand, in the case where the judgment in step S3 is no, the control unit 24 provides the duty ratio with a value (D+α) which is greater than the present value D by the predetermined value α to reduce the opening Θ of the waste gate valve 11 so as to increase the supercharging pressure P for an increased output of the engine (S5).

In the case where the judgment in step S3 is yes, thereafter the control unit 24 judges whether or not the supercharging pressure P is greater than the second predetermined value P1 as shown by a line B in FIG. 4 (S6). The value P1 can be provided by a three dimensional map similar to FIG. 5 in accordance with the engine operating condition. In this case, the value P1 changes depending on the throttle vale opening TVO and engine speed Ne.

If the judgment in step S6 is yes, or the super charging pressure P > the second predetermined value P1, the control unit 24 provides the duty ratio T of the injection signal St with zero to initiate a fuel cut control in which a fuel supply to the engine 1 is stayed. As a result, the engine speed is decreased to causing a turbine wheel rotation to be reduced. Consequently, the supercharging pressure P can be reduced for an improved durability.

On the other hand, if the judgment in step S6 is no, the control unit 24 continues an normal fuel control in which the duty ratio T of the fuel injection signal St is provided by Tp*C wherein C is a compensation coefficient.

While the invention has been specifically described in connection with preferred embodiments thereof, it will be understood by those skilled in the art that the foregoing and other changes or modifications in form and details can be made therein without departing from the spirit and scope of the invention.

What is claimed:

1. A control system for an internal combustion engine comprising supercharging means for supercharging intake gas introduced into the engine, pressure detecting means for detecting supercharging pressure of the intake gas, supercharging pressure control means for controlling the supercharging pressure to a first reference pressure provided in accordance with an engine operating condition, engine output control means for controlling an engine output by means other than the supercharging pressure control means, the engine output being restricted by the engine output control means when the supercharging pressure is increased beyond a second reference pressure which is greater than the first reference pressure, the second reference pressure being increased as the first reference pressure is increased.

2. A control system in accordance with claim 1 wherein the first reference pressure is defined by engine speed and engine load.

3. A control system in accordance with claim 2 wherein the second reference pressure is defined by engine speed.

4. A control system in accordance with claim 3 wherein the first and second reference pressures are increased as the engine speed is increased until the engine speed reaches an intermediate zone of engine speed and are decreased as the engine speed is increased beyond the intermediate zone.

5. A control system in accordance with claim 1 wherein the engine output control means controls a fuel supply to the engine in a manner that the fuel supply is made constant when the supercharging pressure is greater than the second reference pressure.

6. A control system in accordance with claim 1 wherein the first reference pressure is defined by engine speed.

7. A control system in accordance with claim 1 wherein the second reference pressure is defined by engine speed and engine load.

8. A control system in accordance with claim 1 wherein the engine output control means controls ignition timing in accordance with the supercharging pressure.

9. A control system in accordance with claim 1 wherein the supercharging pressure control means is actuated for controlling the supercharging pressure and the engine output control means is not actuated for controlling the engine output when the supercharging pressure takes a value between the first and second reference pressure.

10. A control system in accordance with claim 1 wherein both the supercharging pressure control means and the engine output control means are actuated so as to reduce the supercharging pressure when the supercharging pressure is greater than the second reference pressure.

* * * * *